United States Patent [19]

Donguy

[11] 4,349,155
[45] Sep. 14, 1982

[54] UNFOLDABLE DIVERGENT NOZZLE FOR A ROCKET ENGINE

[75] Inventor: Paul Donguy, Bruges, France

[73] Assignee: Societe Europeene de Propulsion, Paris, France

[21] Appl. No.: 150,912

[22] Filed: May 19, 1980

[30] Foreign Application Priority Data

May 23, 1979 [FR] France ............................... 79 13208

[51] Int. Cl.³ .............................................. F02K 1/24
[52] U.S. Cl. .................................. 239/265.33; 60/271
[58] Field of Search ..................... 239/265.33, 265.37, 239/265.39; 60/271; 244/3.27, 3.28; 16/163

[56] References Cited

U.S. PATENT DOCUMENTS

| | | | |
|---|---|---|---|
| 3,402,422 | 9/1968 | Baer | 16/163 |
| 3,711,027 | 1/1973 | Carey | 239/265.43 |
| 3,784,109 | 1/1974 | Bueringer | 239/265.43 X |
| 3,951,342 | 4/1976 | Baker | 239/265.33 |
| 3,957,206 | 5/1976 | Mason | 239/265.33 |

FOREIGN PATENT DOCUMENTS

| | | | |
|---|---|---|---|
| 58318 | 5/1965 | Australia | 16/163 |
| 1252094 | 10/1967 | Fed. Rep. of Germany | 16/163 |
| 2301667 | 2/1976 | France | 16/163 |
| 1542244 | 3/1979 | United Kingdom | 16/163 |

Primary Examiner—Robert B. Reeves
Assistant Examiner—Gene A. Church
Attorney, Agent, or Firm—Bacon & Thomas

[57] ABSTRACT

An unfoldable divergent nozzle for a rocket engine comprises a set of elementary individual panels of a refractory material articulated together and with respect to a fixed upstream portion of the divergent nozzle in the vicinity of the neck of the nozzle. The articulations between two adjacent panels arranged to be folded on one another with their inner surfaces facing one another; each comprise at least one hinge with two axles inserted in the walls of the two panels articulated to one another, and held at a constant distance from one another by a link set back with respect to the thickness of the panel. Two adjacent panels have in the vicinity of a hinge two cylindrical surfaces respectively centered on each of the axles and rollable without sliding on one another.

3 Claims, 6 Drawing Figures

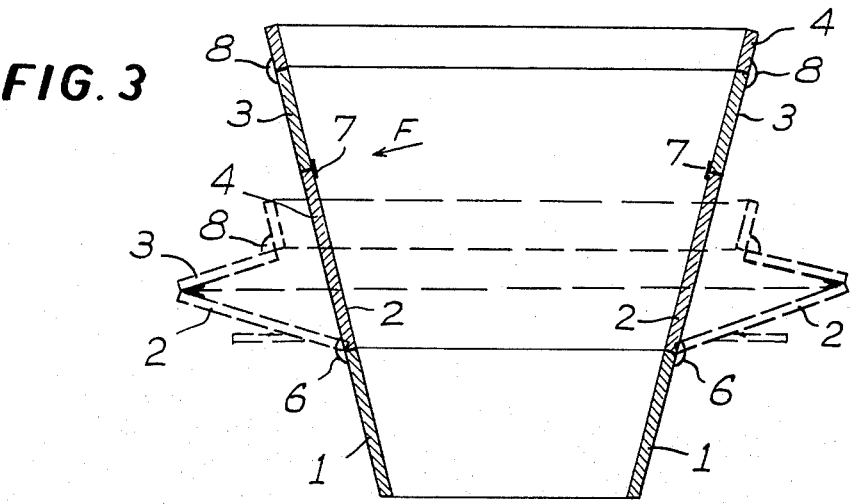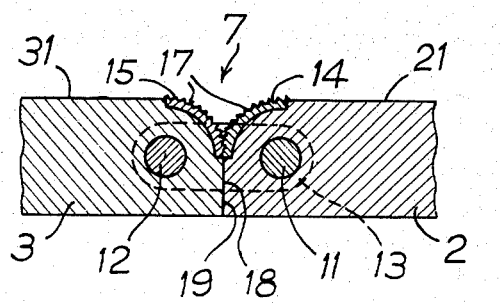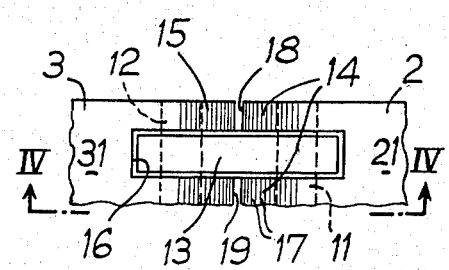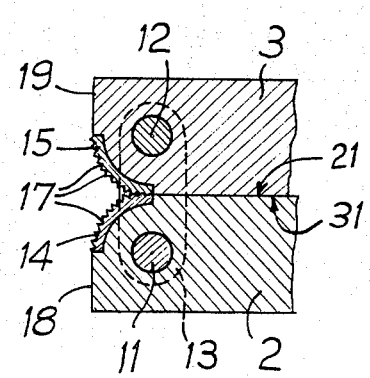

UNFOLDABLE DIVERGENT NOZZLE FOR A ROCKET ENGINE

BACKGROUND OF THE INVENTION

1. Field of the invention

The present invention relates to an unfoldable divergent nozzle for a rocket engine. More particularly it relates to such an unfoldable divergent nozzle comprising a set of elementary individual panels of refractory material articulated to one another and with respect to a fixed upstream portion of the divergent nozzle in the vicinity of the neck of the nozzle, the articulated panels being distributed so as to define at least two successive adjacent rings of frustums and to be positionable in a first folded position then in a second unfolded position, each panel having an inner surface designed to form a portion of the inner wall of the divergent nozzle, and an outer surface designed to form a portion of the outer wall of the divergent nozzle.

2. Description of the Prior Art

It is known, in the technology of powder rocket motors, to use an unfoldable divergent nozzle, that is to say a divergent nozzle which is held in folded position before firing, in order to assist in the forming of a rocket motor of small size, and then is unfolded after ignition of the rocket motor when the missile is in free flight and is no longer subject to length limitations, in order to contribute to increasing the expansion ratio of the gases in the nozzle, and hence to improve the propulsion efficiency.

The possibility of benefiting from an improved propulsion efficiency, due to the fact of the large size of the unfolded divergent nozzle, without the dimensions of the rocket engine before firing being themselves increased, constitutes an appreciable advantage. However, the practical construction of such unfoldable divergent nozzles is not free of posing a certain number of problems. Thus, according to one technique which can be envisaged, consisting of forming an unfoldable divergent nozzle from a set of articulated panels or petals, it is difficult to form articulations capable of resisting the severe environmental stresses caused by the flow of hot gases in the nozzle, when the divergent nozzle is in unfolded position.

It is an object of the present invention to overcome the aforesaid drawbacks and to provide an unfoldable divergent nozzle of the articulated panel type whose reliability is increased, notably due to the fact of the construction adopted for the various articulations of the panels.

GENERAL DESCRIPTION OF THE INVENTION

Accordingly the present invention provides an unfoldable divergent nozzle of the above-defined type, wherein the articulations between two adjacent panels designed to be folded on one another with their inner surfaces facing one another each comprise at least one hinge with two axles inserted in the walls of the two panels articulated to one another, and held at a constant distance from one another by a link set back with respect to the thickness of the panels and two adjacent panels having in the vicinity of a hinge two cylindrical surfaces centered respectively on each of the axles and capable of rolling without sliding on one another.

More particularly, the two cylindrical surfaces of an articulation centered respectively on each of the axles and capable of rolling without sliding on one another are provided with teeth.

The type of articulation applied according to the invention to connect two adjacent petals or panels avoids the essential projecting portions from being in the flow path of the gases in the nozzle and consequently leveled, for example, by the alumina particles which can be present in the flow of gases when the rocket engine utilizes an aluminized solid propellant.

According to a feature of the present invention, the double-axle hinges are of a refractory material such as a carbon-carbon material or a refractory metal.

The teeth formed on the cylindrical surfaces of an articulation may be of a material of the same nature as that of the panels bearing these teeth or be built up on the panels bearing the cylindrical surfaces.

In the latter case, the teeth may be formed of a fusible metal such as aluminum.

Other features and advantages of the present invention will be better understood on reading the description which follows of particular embodiments given purely by way of non-limiting example and with reference to the accompanying drawings.

BRIEF DESCRIPTION OF THE DRAWINGS

In the drawings:

FIG. 3 is a diagrammatic view, in axial section, of an embodiment of the unfoldable divergent nozzle according to the invention.

FIG. 4 is a sectional view of an articulation along the line IV—IV of FIG. 6.

FIG. 5 is a sectional view of the articulation of FIG. 4 in folded position.

FIG. 6 is a view of an articulation between two panels of the divergent nozzle, along the arrow F of FIG. 3.

DESCRIPTION OF PREFERRED EMBODIMENTS

Figure 2:
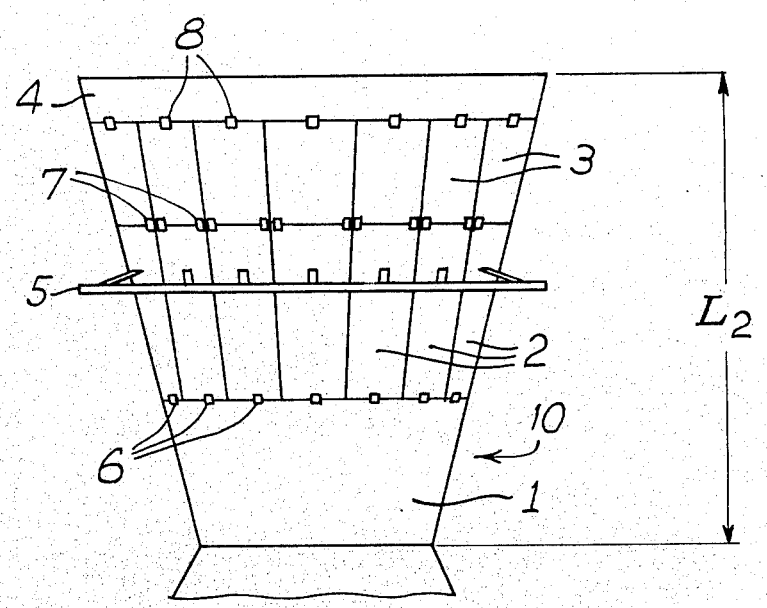
FIGS. 1 and 2 are views in elevation of an unfoldable divergent nozzle respectively in folded position and in unfolded position.
Figure 1:
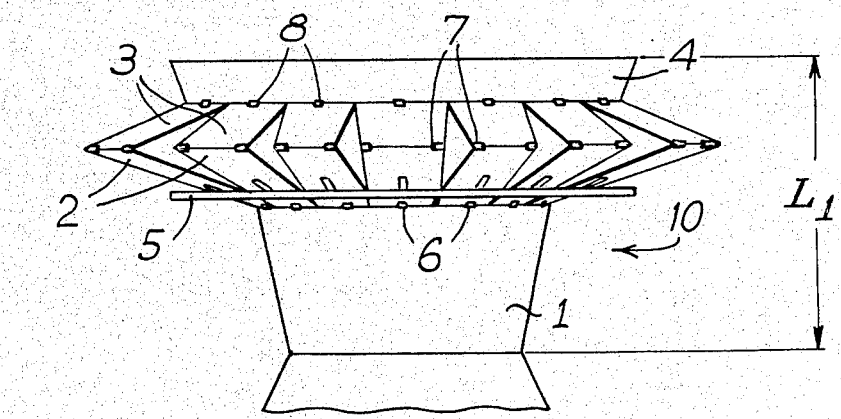

In FIGS. 1 and 2 is seen an unfoldable divergent nozzle 10 for a rocket engine, notably a solid propellant rocket engine, which divergent nozzle comprises a first upstream portion 1 fastened to the neck of the nozzle and forming a fixed portion, a second articulated portion composed of panels or petals 2 articulated on the upstream portion 1 by means of articulation 6, a third articulated portion composed of panels 3 articulated on the one hand on the panels 2 by means of articulation 7 and on the other hand to a terminal ring of the divergent nozzle 4 by articulations B.

FIG. 1 shows the divergent nozzle in the initial pre-firing position. In this position, the panels or petals 2 and 3 are folded on one another to form an acute angle between one another and constitute a collar of short length in the axial direction of the nozzle. The length L 1 of the divergent nozzle 10 overall is hence reduced. An unfolding ring 5 is connected to the outer surface of each of the panels 2 by an articulation. The ring 5 is actuated, by actuating means (not shown) such as jacks, to exert, at a given moment after firing, action on the panels 2 and to bring them into extension of the fixed frustoconic portion 1, in unfolded position. The unfolding of the panels 2 also causes simultaneously the placing of the panels 3 in position in extension of the panels 2, so that in the complete unfolded position of the panels 2 and 3, (FIG. 2), the divergent nozzle 10 is constituted by a single conical frustum and has a length $L_2$ very much greater than the length $L_1$.

The panels 2 and 3 are formed of refractory materials such as carbon-carbon, or phenolic carbon or silica possibly reinforced by an external structure, or a refractory metal.

As can be seen in FIG. 3, in which, for greater clarity, the ring 5 has not been shown, the essential problem posed by the construction of unfoldable divergent nozzles with articulated panels resides in the constitution of the articulations between the panels. In fact, especially in the case where an aluminized propellant is used, any part projecting into the flow path of the gases inside the divergent nozzle is rapidly leveled by the alumina particles of the stream.

As regards the articulations 6 and 8 connecting the foldable panels respectively to the undeformable upstream portion 1 and to the undeformable downstream portion 4, these can be formed by means of hinges located entirely outside the panels 2 and 3. Thus, the articulations 6 and 8 are not subject to the attack of combustion gases. On the other hand, the articulations 7 must have a particular configuration which permits them to withstand the aggressive action of the combustion gases.

The articulations 7 are constituted, in accordance with the present invention, by one or several double-axle hinges constituted in the manner indicated below, with reference to FIGS. 4 and 6.

Two axles such as 11, 12, are arranged respectively in an upstream panel 2 and a downstream panel 3 to be assembled, in the vicinity of the ends of these panels which face one another and are parallel to the plane of the panels 2, 3. The two axles 11, 12 of a hinge are held at a constant distance by a link 13 arranged in recesses 16 formed in the panels 2, 3. The unrecessed end portions of the panels 2, 3 define from the inner surfaces 21, 31 of the panels 2, 3 portions of cylindrical surfaces 14, 15 coaxial with the axles 11, 12 and capable of rolling without sliding on one another. This is possible, for example, by means of the formation of teeth 17 on the cylindrical surface portions 14, 15.

The presence of a type of articulation comprising two rolling surfaces 14, 15 capable of rolling without sliding on one another and constituted substantially by quarter cylinders centered on two parallel axes held at a constant distance from one another by a link, enables, on the one hand, folding to 180° to be permitted of two neighboring articulated panels 2 and 3 (FIG. 5 and elements in dashed lines of FIG. 3), on the other hand a spreading out of the two panels in extension of one another (FIGS. 4 and 6).

It is to be noted that in the unfolded position, which comes into play during firing, only small projections constituted by the teeth 17 of the surfaces 14, 15 are present in the stream of combustion gases inside the divergent nozzle on the side of the inner surfaces 21, 31 of the panels 2, 3.

Owing to the fact that the panels 2, 3 which come into abutment against one another through their transversal surfaces 18, 19 are held in place in open position by the internal pressure which exists in the divergent nozzle 10, the teeth 17 can be leveled by the powder gases without affecting the solidity of the articulation 7. The link connecting the axles 11, 12 is in fact itself set back with respect to the inner surfaces 21, 31 of the panels 2, 3.

A hinge can be formed of carbon-carbon refractory material, or of a refractory metal, according to the applications envisaged. The teeth 17 may themselves be formed of the same material as the panels 2, 3, or be built up by gluing on the surfaces 14, 15 and then be, in this case, formed of a fusible metal such as aluminum, for example.

We claim:

1. An unfoldable divergent nozzle for a rocket engine, having an inner wall and an outer wall and comprising a neck, a fixed upstream portion and a set of elementary individual panels of refractory material articulated to one another and with respect to said fixed upstream portion of said divergent nozzle in the vicinity of said neck of said nozzle, said articulated panels being distributed so as to define at least two successive adjacent rings or frustums and positionable in a first folded position then in a second unfolded position, each said panels having an inner surface for forming a portion of said inner wall of said divergent nozzle, and an outer surface for forming a portion of said outer wall of said divergent nozzle, wherein articulations are provided between two adjacent panels arranged to be folded on one another with their inner surfaces facing one another, each said articulation comprising at least one hinge with two axles inserted in the walls of said two panels articulated to one another, a link being set back with respect to the thickness of said panels and holding said two axles at a constant distance from one another, and wherein two cylindrical surfaces centered respectively on each of said axles and capable of rolling without sliding on one another are arranged on two adjacent panels in the vicinity of said hinge, said two cylindrical surfaces of one articulation centered respectively on each of the axles and rollable without sliding on one another being made of a refractory material and being provided with teeth which are built up on the panels bearing the cylindrical surfaces and are formed of a fusible material.

2. An unfoldable divergent metal according to claim 1, wherein said metal is aluminum.

3. An unfoldable divergent nozzle according to claim 1, wherein the elements of said hinges are of a carbon-carbon refractory material except said teeth.

* * * * *